United States Patent [19]

O'Connor et al.

[11] Patent Number: 5,290,528
[45] Date of Patent: Mar. 1, 1994

[54] PROCESS FOR REMOVING ARSENIC FROM SOIL

[75] Inventors: Mark A. O'Connor; Rodney J. O'Connor, both of College Station, Tex.

[73] Assignee: Texas Romec, Inc., College Station, Tex.

[21] Appl. No.: 836,057

[22] Filed: Feb. 12, 1992

[51] Int. Cl.$^5$ .............................................. C01G 28/00
[52] U.S. Cl. ...................................... 423/87; 405/263
[58] Field of Search .................... 405/263; 423/87, 88; 134/13, 18; 210/638; 71/903

[56] References Cited

U.S. PATENT DOCUMENTS

| | | | |
|---|---|---|---|
| 1,509,688 | 9/1924 | Parsons | 423/87 |
| 1,670,307 | 5/1928 | Little | 423/87 |
| 2,686,114 | 8/1954 | McGauley et al. | 423/87 |
| 4,778,532 | 10/1988 | McConnell et al. | 134/18 |

OTHER PUBLICATIONS

Hawley's Condensed Chemical Dictionary, Eleventh Edition, 1987 p. 861.

*Primary Examiner*—David Brunsman
*Attorney, Agent, or Firm*—John R. Kirk, Jr.

[57] ABSTRACT

An invention for removing arsenic from contaminated soil is described. The process of this invention involves contacting contaminated soil with a carbonated solution either formed by bubbling carbon dioxide through water or dissolving in alkali metal carbonate in water for contact of the contaminated soil. The supernatent solution resulting can then be treated to remove the arsenic, preferably with reverse osmosis, for further use of the water and the decontaminated soil returned to the environment.

17 Claims, No Drawings

PROCESS FOR REMOVING ARSENIC FROM SOIL

FIELD OF THE INVENTION

This invention relates to a method for treating arsenic-contaminated soil in a manner which allows the returning of the soil to original uses in an environmentally safe and acceptable manner. By the practice of the method of this invention the arsenic contaminants are also in a condition for ultimate disposition without contaminating the environment.

BACKGROUND OF THE INVENTION

Arsenic in its many forms is a poison and has long been recognized as such from early literature to the present. Because of its biocidal activity, arsenic has many commercial uses and has been widely used for many years for commercial purposes, notwithstanding the recognition of its hazardous properties. Many uses of arsenic cause it to enter the environment, particularly by the contamination of soil, causing widespread environmental pollution.

Environmental pollution has occurred in the vicinity of certain facilities for wood preservation with water solutions of preservatives containing metal salts through spillage of such solutions from apparatus and wood, with the result that the underlying soil has been contaminated. Use of the treated wood has also introduced arsenic into the environment. Some of these preservatives for wood are based on compounds of copper, chromium, and pentavalent arsenic. Arsenic also finds its way into soil through the manufacture and use of insecticides, defoliants and other arsenicals. It is commonly found as an unwanted contaminant during the process of refining certain metals from ores. Arsenic, in its many forms, has been the subject of much investigation and previous attempts to remove it from the environment are the subject matter of numerous patents. Attempts have been made to treat the arsenic to bind it with the soil through fixation or encapsulation, for example. Such processes are described in U.S. Pat. Nos. 4,921,538; 4,853,208; 4,723,992; 4,329,179; and 4,142,912 for example. Attempts have also been made to leach arsenic from solids as are described in the following patents: U.S. Pat. Nos. 4,891,061; 4,888,207; 4,783,263; 4,457,776; 4,420,331; (Canadian) 1,107,514; 4,244,927; 4,244,734; 4,240,826; 4,220,627; 4,218,425; 4,149,880; 4,102,976; and 2,805,936. Other miscellaneous methods are described for the attempted removal of arsenic from various substrates as described in the following U.S. Patents, for example: U.S. Pat. Nos. 3,939,249; 3,911,078; and 4,778,591.

Notwithstanding the rapt attention the presence of arsenic in soil has attracted, up until this invention a satisfactory method for cleaning arsenic-contaminated soil and returning it to its environment free of such arsenic contamination has not been available, except in limited cases.

In recent years the environmental concerns have developed a considerable amount of information concerning arsenic removal and tests have been developed which are used to monitor its presence by the environmental regulatory agencies. One particular test used as a standard for determining satisfactory removal of arsenic contamination is the Toxicity Characteristic Leaching Procedure, or TCLP analysis, as set forth in *Federal Register*, Vol. 51, No. 9, at 1750 (Jan. 14, 1986). The analytical methods followed to determine such TCLP values are well known and are continuously being developed. For instance, analytical methods normally used are in accordance to the Standard Methods for the Analysis of Water and Waste Water, 16th Ed., American Public Health Association (1985). Arsenic also can be determined according to Procedures for Handling and Chemical Analysis of Sediment and Water Samples, USEPA/Corps of Engineers Technical Committee (May 1981). The environmental regulatory agencies establish maximum criteria for the presence of arsenic and for the TCLP value as determined above.

It is an advantage of this process that the arsenic is removed from the soil and not merely left in the soil at unacceptable levels even though in a theoretically inert state by fixation or encapsulation as previously occurred. Even though primarily designed for arsenic, the method of this invention can be used to extract other undesirable inorganic or organic contaminants of soils, including copper and chromium, thus the soil can be returned to the environment safety and the other contaminants, now concentrated, can be satisfactorily disposed of. Other leaching processes involve the handling of potentially dangerous materials such as strong acids or bases which is avoided in the process of this invention.

Accordingly, it is the object of this invention to provide a process for the separation of arsenic contamination from soil and allow the return of the soil, free of unacceptable levels of arsenic contamination, to its intended use. It is a further object of this invention to provide a method for reclaiming soil contaminated by arsenic such that the arsenic contamination may be safely disposed of in an environmentally responsible manner without the contamination of other parts of the environment. It is further an object of this invention to provide the environmentally safe disposition of arsenic contamination of soil while returning the soil to its intended use, using only materials which are relatively safe to handle and environmentally innocuous. These objectives and advantages are accomplished by the following described invention.

SUMMARY OF THE INVENTION

In its broadest sense, this invention involves a process for contacting soil contaminated with arsenic, other metals, and possibly other toxic species, with a carbonated aqueous solution preferably with stirring, formed by dissolving gaseous carbon dioxide, either in situ or prior to contact, or an alkali metal carbonate in water and contacting the soil with this carbonated solution. In a more specific sense, the method of this invention involves excavating contaminated soil, grinding and sizing the soil to remove rocks and gravel which would normally contain predominantly surface contamination of arsenic, if any, and preparing a carbonated aqueous solution slurry with the soil having about 10% to 50% by weight solids. The supernatent liquid formed containing the arsenic would be removed and the soil recontacted, as necessary, with subsequent carbonated aqueous solution(s) for a time sufficient to cause the arsenic values to be separated from the soil constituents and enter into the aqueous solution. Of course, this may be done in a series of steps using a carbonated aqueous solution having the same source of carbonate or by varying carbonated aqueous solutions to provide for the removal of more difficultly combined arsenic values. In that regard, it is within the scope of the invention to add ancillary materials to the carbonated solution such as complexing agents, surfactants, oxidants or reducing agents in order to expedite the removal of contaminating materials.

It is within the scope of a preferred embodiment to use a series of washings in batch processing, or to employ a semi-continuous removal system such as found in ore flotation removal processes. Once the soil has been treated and separated from the liquid solutions it may then be dewatered and returned to the location from which it was taken or to another appropriate location for use or, if regulations so require, ultimate disposal. The liquid now containing the arsenic could be treated using known processes to concentrate or remove the arsenic, or other contaminating values, to produce a substantially uncontaminated solution which could be successfully used in other environmentally safe matters; preferably, as a recycle water for continued treatment of additional arsenic-containing soil to close the loop.

DETAILED DESCRIPTION OF THE INVENTION

By the more specific following description of the above-identified invention, a person understanding the problems of removing metals from soil will be able to practice an embodiment of this invention as described using information well known in the art of treating solids for removal of environmentally objectionable materials. The practice of the process of this invention is quite flexible and can be carried out either at a fixed central location where the soil is excavated and brought to it; or in modular components which can be moved to a site where remediation of arsenic-contaminated soil is to take place. The equipment and methods for handling the soil through its excavation, grinding, screening, slurrying, and the like, are numerous and well known, and many different configurations can be used. Since a slurry is involved in the practice of this invention, much of the handling can be accomplished as it is with drilling mud in the oilfield environment, or with processes for leaching a metal-containing ore to recover the metallic values. It should be understood by those familiar with the processes for handling solids for decontamination treatment that the invention and process described in the following discussion may be adapted for use in a number of physical procedures.

As is well known, there are many different kinds of soil, including sludge on the bottom of a lake or lagoon which may also be contaminated with an arsenic waste requiring treatment for separation to produce an environmentally acceptable solid material. In that instance, the soil is separated either when dry or in a slurried condition from large rocks and gravel. The rocks and gravel, though contaminated, are susceptible to cleaning using a purely surface treatment as described as a part of this invention. Even though arsenic has a potential of changing oxidation states in nature with the passage of time in contact with soil and migrating into the interstices of the solids to cause more difficult removal, sands, gravel and rock, normally non-porous, would typically require only one or several surface contact with the carbonated solution before being returned to the ecology.

The soil, however, presents a more difficult problem and should be sized either through dry grinding or in the liquid handling equipment such that the particles being treated through the method of this invention is preferably about a size which would pass through a standard 40 mesh screen. However, more coarse or finer soil particles may be successfully treated.

In a preferred embodiment of this invention, sized dry soil is placed in a slurry having from about 10% to about 50% by weight solids and, preferably from about 30% to about 45% by weight solids depending upon the type of soil involved, degree of contamination and the difficulty involved to remove the arsenic. The slurried soil is carbonated, preferably in a closed, stirred batch reactor by introducing carbon dioxide gas, under pressure, into the reaction vessel. Stirring, though optional, reduces contact time and assures intimate contact with the soil. The carbon dioxide is introduced into the vessel under a pressure of from about 15 to 1,000 psi, preferably from about 250 psi to about 500 psi. Though lower pressures may be used, these higher pressures increase the solubility of carbon dioxide in water and thus improve the concentration of the carbonated solution. While lower concentrations may be successfully used in the aqueous carbonated solution it is preferred to operate with continuous addition of carbon dioxide at near the saturation point of carbon dioxide in water. Accordingly, even higher pressures are tolerable, and often desirable, but in instances, particularly where the process is carried out at the site of remediation, there is a practical limit to such pressures.

The leaching is allowed to continue for a time sufficient to optimally remove the arsenic contamination from the soil. The time required, of course, will vary with the type of soil being decontaminated; the quantity of soil; the degree of contamination; the nature of the arsenic present; and the concentration of the carbonated leaching solution employed. Routine experimentation would be used to determine the amount of time required in a given circumstance and the number of times a specific treatment step should be repeated, preferably three to five times. Such tests may be readily performed by those having skill in the treatment of contaminated solid wastes.

Once such first treatment is accomplished, the supernatent liquid formed, now containing the arsenic waste, is separated from the soil. This can be accomplished by either pumping the entire slurry through a filter system or centrifuge but may very well be accomplished by holding the soil in the leaching vessel and simply draining the water. In the case of pressurized carbon dioxide use, it is preferable to filter the mixture under the pressure of such carbon dioxide to avoid reprecipitation into the soil as carbon dioxide is released. Only in relatively rare situations will a single leaching step be sufficient, even though a single step treatment is considered to fall within the practice of this invention. In the normal situation a second leaching step, or even more leaching steps, should be required. In subsequent steps more difficulty removable arsenic values must be removed. Therefore the carbonated aqueous solution may properly be formed from a different carbonate source. In the preferred practice of this invention, the soil will be contacted in the second step by an aqueous solution containing an alkali metal carbonate, preferably sodium carbonate, for time to effect sufficient removal of more arsenic. This step is preferably performed two more times. The concentration of the alkali metal carbonate would normally be from about 1% to about 10% by weight, preferably from about 3% to about 8% by weight and the reactor would include a provision for stirring the slurried mixture during leaching. Of course, if an alkali metal carbonate source of the aqueous carbonate leaching solution is used there is no need for elevated pressures to be present. Once the anticipated time for leaching is past, the supernatent liquid would again be separated from the soil using well known methods and equipment. Analysis of the soil would be made to determine whether the total arsenic content and the TCLP values of the arsenic are sufficiently low to meet applicable regulatory criteria for decontamination to allow disposal of the soil in an environmentally safe way. Regulatory criteria for decontamination often have been found to change with the development of technology. The processes of this invention are sufficiently flexible and repetitive to meet a changing regulatory climate. If the criteria are not met, then additional leaching steps may be required either by repeating the previous step or using a different carbonated solution, or placing other additives into solution.

In the event that difficulty removable arsenic values remain with the contaminated soil, additional leaching steps may be used. It has been found that an alkali metal carbonate solution heated to from about 100° F. to about 200° F. improves removal of these less soluble species, in which case a closed vessel is preferable to reduce evaporation. In addition to the use of the carbonated leaching solution described herein, additional additives may be included. These materials can include surfactants which are well known in the leaching of solids or complexing agents which may help solubilize contaminants from the soil. In a situation where the oxidation state of the arsenic present, or of other contaminating species which may be present, must be altered to improve leaching, well known reducing or oxidizing agents could be used. Other additives will be apparent to those skilled in solids treatment or leaching.

After the final leaching step has occurred, the soil is dewatered, again tested to determine whether or not it meets applicable environmental criteria of decontamination, and then may be returned to the site from which it came.

The use of carbonated aqueous solutions offers several unique advantages over alternative methods using mineral acids or strong alkalis. The use of the aqueous carbonate solution of this invention imposes suitably narrow limits of pH of from about 3 to about 5 when dissolved carbon dioxide is used and from about 8 to about 10 in the alkali metal carbonate system, thus minimizing the undesirable leaching of nontoxic species such as sulfates (solubilized in strong acids) or aluminum salts (solubilized in strong alkalies) while readily solubilizing arsenates and arsenites. Further, toxic anions such as nitrate from nitric acid leaching are avoided by use of nonhazardous carbonates, and the potential for generating toxic arsine or hydrogen sulfide gases is minimized. Additionally, carbonated solutions of this invention are much safer to work with than concentrated metal hydroxides or mineral acids. Both carbon dioxide and sodium carbonate, the preferred alkali metal carbonate, are quite inexpensive compared to most alternative leaching agents, particularly when commercial "soda ash" is used as the sodium carbonate source. These lowered costs, among other factors, notably the potential to dispose of treated soil on the site, contribute to the economic advantage of the present invention.

Although it may be possible to effect an essentially equivalent removal of arsenic from certain soils by extraction only with sodium carbonate solution as with aqueous dissolved carbon dioxide extraction followed by a sodium carbonate extraction, the latter is preferred because of the total dissolved solids concentration of the carbonated water leachate is lower, which dramatically increases the amount of water that can be recycled into the process rather than lost to disposal.

The aqueous leachates collected are processed, when feasible, to recover decontaminated leachate solutions for reuse or, when suitably dilute, to recover purified water by reverse osmosis procedures as described in co-pending patent application Ser. No. 07/778,568, filed Oct. 17, 1991 now U.S. Pat. No. 5,182,023, which is incorporated herein by reference for all purposes. The recovered purified water can be returned to the process of this invention or used elsewhere or returned safely to the environment.

The above-described invention will now be further described and exemplified by the following examples which include the best way to practice the methods of this invention known at this time, given certain of the soil samples used.

EXAMPLES

In the following examples, an aged soil sample from an arsenic-contaminated site was used which was characterized as "clayey sand." This sample was run through sieve with a retention of 40% on the 40 mesh screen. Gravel, about 13% by weight, was removed and the balance of the soil ground and resized. About 72% passed through a 40 mesh screen and was, insofar as possible, divided into 22 separate identical samples. Approximately 100 gms of sample was used in each experiment. The carbonated water (aqueous carbon dioxide) extractions were performed in a tubular, pressurized vessel having an outlet covered by a sintered steel 0.45 microd filter to facilitate the separation of liquid and soil being decontaminated. Pressurized carbon dioxide was sparged into the vessel and then used to push the leachate through the filter while under pressure. The other leaches, such as with the sodium carbonate, were run in a beaker at atmospheric pressure with a magnetic stirrer. The arsenic content of the samples of sized, untreated soil analyzed was between 5510 and 8100 ppm as As, with an average of about 7100. The average TCLP value was about 160 ppm.

Interim analyses of the arsenic content of the supernatent liquid separated at each step was determined using a semi-quantitative colorometric strip analysis for determining $As^{+III}$ and $As^{+V}$ concentrations obtained from E.M. Science of Bibbstown, N.J. In each instance where analyses were made of a liquid, dilutions of the supernatent liquid were necessary in order to bring the concentration of solution within the range of the colorometric strips. In each case before the supernatent liquid was separated from the soil, the soil was allowed to settle from being stirred in the presence of the leaching carbonate aqueous solution. Each percentage expressed was based upon the amount of arsenic in the original soil sample.

In each of the examples where a composite sample was run in Step 1, separate semi-quantitative analyses were made of each decantation prior to combining the liquids to determine the degree of arsenic present in each separate sample in order to determine when the extractions with the carbonate containing solution ceased to be effective. It was found that a single washing removed almost half of the arsenic removed in a 5 or 6 stage leaching using carbon dioxide gas described as step 1. All concentrations are expressed as percent of weight.

EXAMPLE 1

The first stage extraction of this sample involved five repetitions of adding approximately 150 ml distilled water to the reactor described above containing 100 gms of contaminated soil. The reactor was closed and carbon dioxide gas was charged through a sparger, to a pressure of 225 psi allowing the gas pressure to push the leachate through the filter (from about 10 minutes to 4 hours). The supernatant liquid was filtered into a container and saved. A total of 720 ml of water was obtained from the five repetitions and interim analysis as described above indicated that 44% of the arsenic present in the soil was removed by the five repetitions of this step.

Then the soil was stirred in 250 ml of a 4.2% sodium carbonate solution for 2 hours, allowed to settle for 2 hours, and the supernatent liquid removed. Semi-quantitative analysis showed 33% of the original arsenic in the soil was removed.

In step 3 a solution of 350 ml of a 3.2% sodium percarbonate solution was stirred with the soil treated in the previous two steps for a period of 4 hours, allowed to settle, and decanted. Semi-quantitative analysis showed a removal of an additional 10% of the original arsenic.

Step 4 was a repeat of step 1. Carbon dioxide was charged, with stirring, into the reactor to which 250 ml of water had been charged (240 ml recovered) at 250 psi for 17 hours, showed that no additional arsenic was removed. A final step involved stirring the soil and 400 ml of 5.5% $Na_2CO_3$ for one hour with a 7% removal. A final analysis of the soil sample indicated a residual 480 ppm arsenic and a final TCLP arsenic analysis of 4 ppm, a 94% reduction of total arsenic and a 97.5% reduction of TCLP arsenic, based upon the above average values.

EXAMPLE 2

The five stage extraction as described in Example 1 was repeated with 730 ml supernatent liquid recovered and an approximately 46% arsenic removal experienced.

In step 2 of this example, one liter of solution containing 3.3% $Na_2CO_3$ and 1.5% sodium percarbonate was stirred with the soil for 19 hours, allowed to settle, and decanted. About 38% arsenic was present in the recovered liquid, based upon the average values above.

The third step involved stirring for 19 hours in the presence of 500 ml of 2.5 weight % sodium carbonate. About 9% arsenic was removed. A final stage involved stirring the soil in 175 ml of a 6.2 weight % solution of sodium carbonate for 18 hours. Approximately 1% of the arsenic was removed. The liquid was recovered and the soil analyzed for arsenic indicated a quantitative total arsenic of 410 and 370 ppm (two analyses) with a TCLP arsenic value of 2.3 ppm, a 94.5% reduction of total arsenic and a 98.6% reduction of TCLP arsenic.

EXAMPLE 3

The first stage was a repeat of the same step as used in Example 1 except that six stages at 300 psi were followed with a collection of 750 ml liquid. 45% removal was experienced.

Stage two involved stirring for 5 hours in the presence of 750 ml of 7.5% sodium carbonate solution. After settling for 6 hours the decanted liquid indicated an additional 42% was removed.

Step three involved stirring for 4 hours with a 250 ml solution of 7.5% sodium carbonate to recover an additional 5%.

A fourth step involved stirring with a 250 ml 7.5% sodium percarbonate (?) solution for 4 hours to recover an additional 2% arsenic based on the original arsenic content.

Step 5 involved stirring with 250 ml 7.5% sodium carbonate plus 0.5% gluconic acid (ph 11.3 with NaOH) for a period of 4 hours. Additional recovery appeared to be less than 1%.

A final step involved stirring with 150 ml 7.5% sodium carbonate at 160° F. to 190° F. for 3 hours with an additional 2% (based upon the original content) being recovered. Quantitative analysis of the final product showed 240 ppm total arsenic with a TCLP value of 2.2 ppm, a 96.6% reduction in total arsenic and a 98.6% reduction in TCLP arsenic, based upon the average values above.

EXAMPLE 4

In this example, using the equipment described above, the first step involved stirring, with the contaminated soil, a 750 ml solution of 7.5% sodium carbonate for a period of 5 hours. After the soil settled, the decanted supernatent liquid was semi-quantitatively analyzed to show that 81% of the arsenic originally in the soil was removed. Step 1 was repeated with a fresh 750 ml of the same solution for 10 hours, stirring to remove an additional 12%. The third step involved stirring 250 ml of the same solution for 3½ hours. Analysis indicated a 1% removal. The same amount of removal was determined when the soil was stirred with 250 ml of a 7.5% sodium percarbonate solution for 4 hours. The final step of this example involved stirring the soil with 250 ml solution of 7.5% sodium carbonate plus 0.5% gluconic acid, with the pH adjusted to 11.3 with sodium hydroxide, for 3 hours.

The final quantitative analysis of the soil indicated a TCLP arsenic value of 1.1 ppm with total arsenic analyzing, two analyses, respectively 410 and 360 ppm, a 94.6% reduction of total arsenic and a 99.3% reduction of TCLP arsenic, based upon the average values above.

While the foregoing examples are illustrative of the batch processing of the contaminated soil using the above invention, it is understood that continuous countercurrent equipment as is common in the leaching of ores may be used with the carbonate solution being sodium carbonate. While a pass through the countercurrent flow continuous processing may not be sufficient in and of itself to reduce the arsenic to acceptable levels, it is contemplated that an additional batch step may be involved to effect satisfactory completion of the treatment.

Now having described the foregoing invention in connection with enabling others to practice the invention and having told the best way of practicing the invention of which we are aware, many modifications and adjustments of the methods followed and reagents used may be made without departing from the scope of the appended claims.

We claim:

1. A method for treating soil contaminated with arsenic which comprises the steps of a. contacting the contaminated soil with a carbonated aqueous solution for a time sufficient to leach arsenic from the soil into the aqueous solution;

b. separating the leached soil from the aqueous solution containing the leached arsenic.

2. The method of claim 1 wherein the carbonated aqueous solution is formed by injecting gaseous $CO_2$ at a pressure of from 15 to about 1,000 psi into water to form the carbonated solution to contact contaminated soil.

3. The method of claim 2 which includes the steps:
sizing the soil to separate rocks and gravel from the soil;
grinding the soil to pass a standard 40 mesh screen; and
mixing the soil with water to form a slurry having from about 10% to about 50% by weight solids before injecting the $CO_2$.

4. The method of claim 2 wherein steps a. and b. are repeated.

5. The method of claim 1 wherein the soil is treated in situ.

6. The method of claim 1 wherein the carbonated solution is about 1% to about 10% by weight of an alkali metal carbonate.

7. The method of claim 6 wherein the alkali metal carbonate is sodium carbonate.

8. The method of claim 7 wherein steps a. and b. are repeated.

9. A method for removing arsenic from contaminated soil which comprises the steps of:

a. sizing the soil to pass through a screen of about a 40 mesh size;

b. slurrying the sized soil to a level of from about 10% to about 50% solids by weight with a carbonated aqueous solution formed by introducing gaseous carbon dioxide into the soil slurry to contact the arsenic contaminated soil at a pressure of from about 15 psi to about 1,000 psi for a time sufficient to react with arsenic present in the soils;

c. separating the soil from the solution;

d. slurrying the soil with an alkali metal carbonate solution containing from about 1% to about 10% by weight alkali metal carbonate based upon the amount of water used to form the slurry having from about 10% to about 50% by weight solids content for a time sufficient to react with arsenic present in the soil; and e. separating the soil from the water.

10. The method of claim 9 wherein the alkali metal carbonate is sodium carbonate.

11. The method of claim 10 wherein steps b. through e. are repeated.

12. The method of claim 11 wherein one or more step d. extractions are performed at a temperature of from about 100° F. to about 200° F.

13. The method of claim 9 wherein the pressure of the carbon dioxide is from about 250 psi to about 500 psi and step b. is repeated from 3 to 5 times and step d. is performed twice with soil separation following each step.

14. A method for removing arsenic from contaminated soil which comprises the steps of:

a. sizing the soil to pass through a screen of about a 40 mesh size to separate particles of gravel from soil;

b. slurrying the sized soil to a level of from about 10% to about 50% solids by weight with a carbonated aqueous solution formed by introducing gaseous carbon dioxide into the soil slurry to contact the arsenic contaminated soil at a pressure of from about 250 psi to about 500 psi for a time sufficient to react with arsenic present in the soils;

c. filtering the soil from the solution;

d. repeating steps b. and c. two times to partially decomtaminate the soil;

e. contacting, with stirring, the partially decontaminated soil with a sodium carbonate aqueous solution containing from about 3% to about 8% by weight sodium carbonate based upon the amount of water used to form the slurry having from about 30% to about 45% by weight solids content for a time sufficient to react with arsenic present in the soil;

f. separating the soil from the water;

g. repeating steps e. and f. and recovering dewatered soil; and h. disposing of the dewatered soil to meet applicable regulatory criteria.

15. The method of claim 14 wherein the water from each step is collected for disposal.

16. The method of claim 15 wherein the water is treated by reverse osmosis to recover water suitable for safe return to the environment, and dispose of arsenic contaminated water remaining.

17. The method of claim 16 wherein the recovered water is recycled to the prior slurrying steps of the method.

* * * * *